Sept. 19, 1950    J. H. DE LAVAL    2,522,704
METHOD AND APPARATUS TO TREAT MATERIAL IN
FORM OF PIECES OR POWDER WITH GASES
Filed April 5, 1943
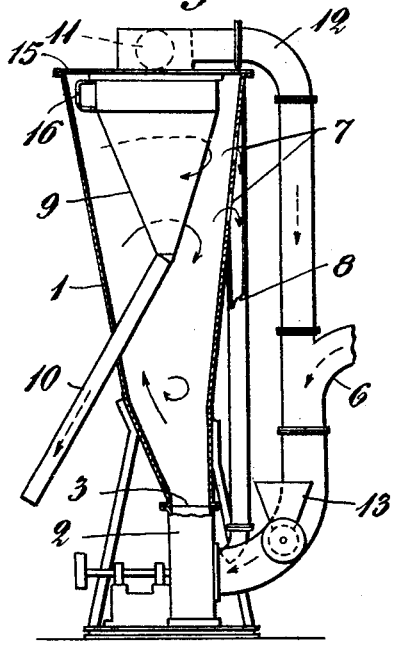
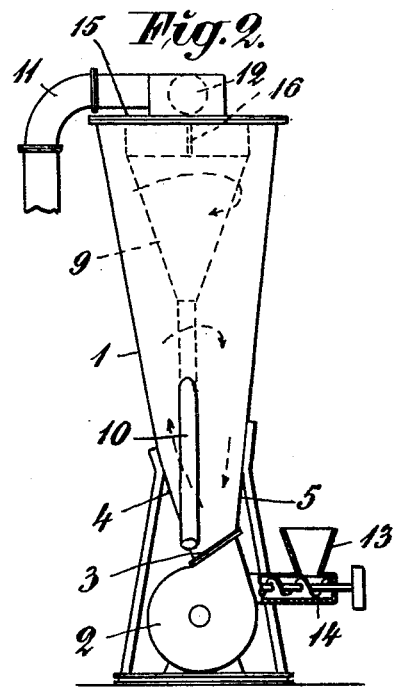
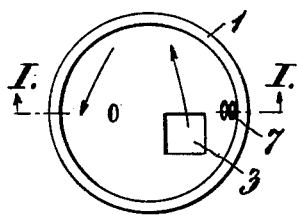
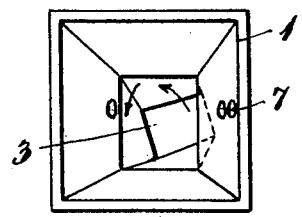
INVENTOR
Jacques Hjalmar de Laval
By Jarvis C. Markle
his attorney

UNITED STATES PATENT OFFICE 2,522,704

METHOD AND APPARATUS TO TREAT MATERIAL IN FORM OF PIECES OR POWDER WITH GASES

Jacques Hjalmar de Laval, Stockholm, Sweden

Application April 5, 1943, Serial No. 481,930
In Sweden December 8, 1939

3 Claims. (Cl. 34—10)

My invention relates to method and apparatus for the treatment of non-homogeneous material in the form of pieces or powder with a gas, for instance in connection with drying processes, chemical reactions, dry distillations, and combustion processes. More particularly, the invention relates to treatment of vegetable such as grass and other green forage, animal foods such as fish, fuels such as needles of pine, peat, sawdust, and so forth. It is essential that in the treatment of this type the end product becomes uniform so as to have, for instance, the same moisture content. To this end the treatment of the coarse constituents is to be finished, for instance dried throughout, while the fine constituents are not allowed to become overtreated, for instance excessively dried or burnt. Therefore, the time of treatment must vary for coarse and fine constituents of the material.

It is known to dry material in a continuous cycle, where the material is kept suspended in the gas. To obtain a high capacity in such an apparatus, the period of treatment should, in the first place, be variable and controllable, that is a longer period of treatment will be required for the coarse constituents than for the fine constituents of the material, and, in the second place, the contact surface, that is the surface of the material brought into contact with the gas, should be large.

It is known for varying the period of treatment to separate coarse material from finer material, whereupon the coarse material is returned to be subjected to repeated treatment. In the known apparatus for this purpose the separation as a rule is effected in apparatus in which the heavy particles are separated due to the action of gravity.

One of the objects of the invention is to provide an improved separation by causing the body of gas to be rotated, and to accomplish the separation by means of a centrifugal action, such separation then proceeding more rapidly and becoming more complete, inasmuch as the field of force may within certain limits be made relatively great.

In accordance with another feature of the invention, the treatment of the material is carried so far that the treatment of the major portion of the fine constituents thereof will be finished, whereupon the material is subjected to a separation taking place under the influence of the centrifugal force within a separating zone, wherein the mass is rotated with a suitable speed. This separation, which is termed the coarse separation in the following, separates the fine constituents from the coarse constituents, the treatment of which has not been finished as yet, and which latter constituents are returned to a preceding phase of the process.

A further object of the invention is to provide an apparatus for carrying the process into effect, such apparatus being much simpler and smaller than the apparatus hitherto known.

In accordance with a further feature of the invention, a variable and controllable period of treatment is provided for the material, the latter being subjected at the same time to separation through centrifugal action while the gas supporting the material is subjected to a rotary movement.

Prior to the coarse separation, the material is frequently subject to a pretreatment, in which the material is then either subjected to a rotary movement, or is caused to move substantially straight, in which case the rotary movement is brought about only in the separation zone. According to a further feature of the invention, said rotary movement may be caused to take place within one and the same chamber which has the zone of separation. While the coarse constituents of the material separated in this zone are returned to a preceding phase of the process, there will thus simultaneously be created a circulation or rotary movement, primarily of the coarser constituents, between zones of different levels or temperatures. In this rotary movement of the material there will be effected a repeated treatment or extension of the treatment relatively to a movement in one and the same principal direction through the chamber. This repeated treatment, for instance at a rotary movement or circulation about a horizontal axis, involves returning of material, the height of ascension of the material being limited to a certain portion (the lower part of the chamber). The material is caused to ascend along one wall of the chamber and to descend along the opposite wall. If a rotary movement of the material is set up in the vertical as well as in the horizontal plane, and the rotation in the vertical plane is limited to the lower part of the chamber, there will be obtained, according to the invention, a remaining rotary movement of the gas carrying the material in the horizontal plane in the upper part of the chamber, wherein the zone of coarse separation is located. In this zone, the gas and the material attain a low axial and a comparatively high tangential speed.

By controlling the period of treatment, the material may pass through certain zones, such as a hot zone, at a rapid rate, so that the material is not burnt, whereas other zones are passed at a low rate, such as when coarse separation and the final treatment are performed at lower temperatures. By the fact that the circuit comprises hot zones, which are passed at a rapid rate, and cooler zones, wherein the material will stay for a longer time, the course of treatment will pass various phases in the treatment with hot gases— drying and so forth. This will accelerate the process and facilitate the complete realization thereof.

A high capacity of the plant presupposes a high heat transfer. In accordance with a further feature of the invention, the material may be cut up further in the course of the process, said material, if consisting of vegetables, for example, becoming more and more brittle during the treatment.

An irregular movement—eddy currents—increases the contact surface. This surface is also increased with an increased gas speed, inasmuch as each particle rotates in the gas current at an angular speed in a certain proportion to the axial speed. From this appears the advantage of using high speed in hot zones and low speed in cool zones—as stated hereinbefore—and of causing coarse particles to pass through the circuit rapidly and repeatedly.

Further objects and features of the invention will be apparent from the following description considered in connection with the accompanying drawings, which form a part of this specification, and of which:

Fig. 1 shows an embodiment of a plant constructed in accordance with the invention, the same being in part a sectioned view on the line I—I of Fig. 3.

Fig. 2 shows the plant in elevation at right angles to the section shown in Fig. 1.

Fig. 3 is a horizontal view of a tower comprised in the plant, a cyclone separator provided in said tower being omitted from this figure, and Fig. 4 is a similar view of a square tower.

In connection with the description of the drawings, the application of the invention in the drying of forage, such as clover or alfalfa, will be discussed, but it should be expressly understood that the invention is not limited thereto.

In Figs. 1-3, 1 designates a tower or chamber having a downwardly tapering round section, and 2 a fan located underneath the tower and eccentrically relative to the central axis thereof (see Fig. 3). The mouth 3 of the fan extends obliquely both in the horizontal and the vertical plane relatively to the walls of the chamber, in such manner that the gas jet leaving the fan is thrown onto the wall of the chamber while being at the same time subjected to a rotary movement. The gas jet with the material carried thereby will thus flow upwardly within the chamber in a helical or spiral-shaped path of flow. That wall (4 in Fig. 2) of the chamber which is hit by the gas jet will be termed the pressure side and the opposite wall 5 the lee side. The angles of the gas jet to the pressure side and the lee side are different, as will appear from the above, and so determined that no material can remain sticking to the walls. This depends on the relationship between the gas velocity, the angle of inclination of the surface, the weight of the particles and the friction thereof, which varies with their moisture content. For this reason the lee side is made steeper than the pressure side, so that the coarser constituents of the material, that is to say of the green forage in the present case, will fall down at this side to be hit by the gas jet which is ejected from the mouth of the fan, and will again be moved upwardly in the chamber. I prefer to make the bottom of the chamber and the mouth of the fan coincide, that is to say, the gas jet may be said to form a fictitious bottom of the chamber. The fan may be provided with knives or saw-blades to cut up the material. Associated with the plant is a furnace (not shown), in which hot gases, preferably combustion gases, are generated. The furnace communicates with the suction side of the fan 2 through a pipe conduit 6. The fresh forage to be dried, and which may be previously subdivided into smaller pieces, is introduced into the conduit 6 through a funnel 13 with the aid of a screw feeder 14.

Provided on one side of the chamber 1 are one or more apertures 7 of a suitably adapted extension in the vertical direction, said apertures being connected through a pipe conduit 8 with the conduit 6 adjacent to the suction side of the fan. The end portion of the conduit 8 opening into the conduit 6 may be bent forward in the direction of the gas current through the last mentioned conduit, as will be seen from Fig. 1. A cyclone separator 9 which may be of any known construction, with a tangential intake 16, the cross sectional area of which may be adjustable, if desired, is secured with a tight fit to a roof 15 closing the chamber 1 at the top, said separator extending down into the chamber. The intake 16 imparts to the gas, at the entrance thereof into the cyclone, a speed of such magnitude that the separation aimed at is insured therein. The cyclone, which is conical, is provided at its lower narrower end with an outlet pipe 10 for material in the finished state and with outlet pipes 11 and 12 for gas. The outlet pipe 12 communicates with the pipe conduit 6 from the oven.

The mode of operation is as follows. Hot gas, which in the present case should be free from oxygen as far as possible, together with material fed in through the funnel 13, is sucked in by the fan 2 and carried by the latter up into the zone of pre-treatment of the tower 1. Said zone extends up to a level close beneath the aperture or apertures 7, and in which the material gets a substantially vertical rotation, the same being moved upwardly along the pressure side 4 and falling downwardly along the lee side 5. According as the moisture escapes from the material, it will be thrown higher and higher up and automatically reaches the zone of coarse separation located above the zone of pre-treatment. Here, the material attains through the helically or spirally ascending gas a substantially horizontal rotary movement, that is to say at a small velocity in the axial direction, the coarser, or from point of view of specific gravity, heavier constituents of the material, not yet dry, then moving outermost, while the finer constituents move at the centre. When the coarse constituents pass through the aperture 7, they will be sucked back through the return conduit 8 to be cut up by the fan 2, and then continue up into the chamber 1 to be subjected to another treatment. The fine constituents of the material, the treatment of which has been finished, collect centrally in the upper portion of the chamber, and are sucked in through the tangential intakes 16 of the cyclone 9. The finally treated material is separated in the cyclone from gas in a manner known per se. This material escapes through the pipe 10, and the gas passes partly through the aperture 11, for instance for the preheating of non-treated material, and then out to the atmosphere, and partly through the pipe 12 over the fan and back to the chamber 1.

In the drying of alfalfa, for example, the temperature of the combustion gases coming from the furnace may be, in the example of embodiment above described, for instance to 1,200 degrees centigrade, and, at the inlet of the fan, to 400 degrees. In the lower portion of the drying zone of the chamber 1, the temperature is about 200 degrees, and successively falls to about 100–120 degrees within the uppermost zone of the chamber. Obviously, these figures are in no way definite, the same intending only to illustrate the mode of operation according to the invention. At the same time, the gas velocity may amount to 30–40 meters per second in the fan chamber and, for instance, to 2–1 meter per second in the uppermost portion of the chamber.

In certain cases, for instance a treatment of material particularly sensitive to heat, two or more apparatus may be connected in series. Then, for instance, the pipe 10 of a preceding apparatus is connected with the funnel 13 of a succeeding apparatus. It is also possible to cause the pipe 8 of an apparatus to open into the funnel 13 of an adjacent apparatus. In this way, a very moderate drying effect may be obtained in each apparatus.

In the embodiment according to Fig. 4, the tower or chamber 1 is of square cross section. By this means the returning of the material in the zone of pre-treatment is augmented, inasmuch as the heavier constituents of the material will be thrown out into the corners where they lose in velocity and sink to a lower zone with a higher temperature. The eccentrically located mouth 3 of the fan is of trapeziform shape. The other details of the plant may in this embodiment be as described above.

In the embodiments above discussed, the mouth of the fan may be of any suitable configuration for causing the gas leaving the fan to take the course of flow above described.

While I have shown preferred embodiment of the invention, it is to be understood that these are for the purpose of illustration only, and that the invention is not to be limited thereby, but its scope is to be determined by the appended claims.

What I claim is:

1. In a method of gaseous heat treatment of comminuted material having particles of different sizes, the steps of heating air to a high temperature, imparting velocity to the heated air with the aid of a fan, introducing the material into the air ahead of the fan, passing the material through the fan for initial drying at high temperature and to break up the larger particles, passing the gas discharged from the fan spirally upwardly through a classifying chamber to further dry and classify the material, separating the heavier particles and utilizing an air stream to return the separated particles to the inlet of the fan for further breaking up and drying, and removing the lighter particles from the classifying chamber.

2. A method as set forth in claim 1 in which the temperature and velocity of the gas are both substantially higher in the fan than in the classifying chamber in order to effect the major portion of the drying in the fan while subjecting the material to the high temperature for a minimum period of time to avoid damaging the material.

3. Apparatus for the gaseous treatment of comminuted material consisting of particles of various sizes including a vertically disposed chamber, a fan having an inlet and an outlet, means for supplying hot gas to said inlet, means for supplying said material to said inlet, said outlet communicating angularly with the lower part of said chamber so as to impart an upwardly spiral movement to the gas and material within said chamber, a vertical wall of said chamber being provided with an opening for receiving coarser constituents of the material which are impelled through the opening by centrifugal force, means for returning said coarser constituents to the inlet of said fan, and means for separating the finer constituents from the gas at the upper end of said chamber.

JACQUES HJALMAR DE LAVAL.

REFERENCES CITED

The following references are of record in the file of this patent:

UNITED STATES PATENTS

| Number | Name | Date |
| --- | --- | --- |
| 790,162 | Trump | May 16, 1905 |
| 940,076 | Seaver | Nov. 16, 1909 |
| 1,840,857 | Testrup et al. | Jan. 12, 1932 |
| 2,054,441 | Peebles | Sept. 15, 1936 |
| 2,077,346 | Voskamp | Apr. 13, 1937 |
| 2,118,078 | Flugel | May 24, 1938 |
| 2,156,924 | Schneider | May 2, 1939 |
| 2,313,956 | McGrane | Mar. 16, 1943 |
| 2,316,207 | Winter | Apr. 13, 1943 |
| 2,351,091 | Bar | June 13, 1944 |

FOREIGN PATENTS

| Number | Country | Date |
| --- | --- | --- |
| 391,388 | Great Britain | Apr. 27, 1933 |
| 395,912 | Great Britain | July 27, 1933 |
| 499,428 | Great Britain | Jan. 24, 1939 |
| 548,665 | Germany | Apr. 16, 1932 |